Oct. 25, 1949. C. C. CHURCH 2,486,260
EDUCATIONAL APPLIANCE
Filed Oct. 31, 1945
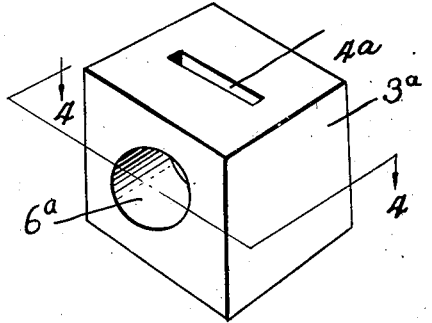
FIG. 3.
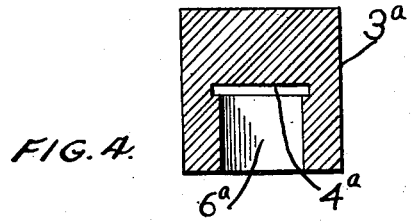
FIG. 4.
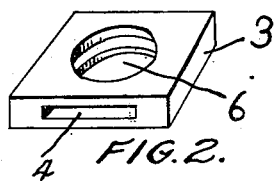
FIG. 2.
FIG. 1.
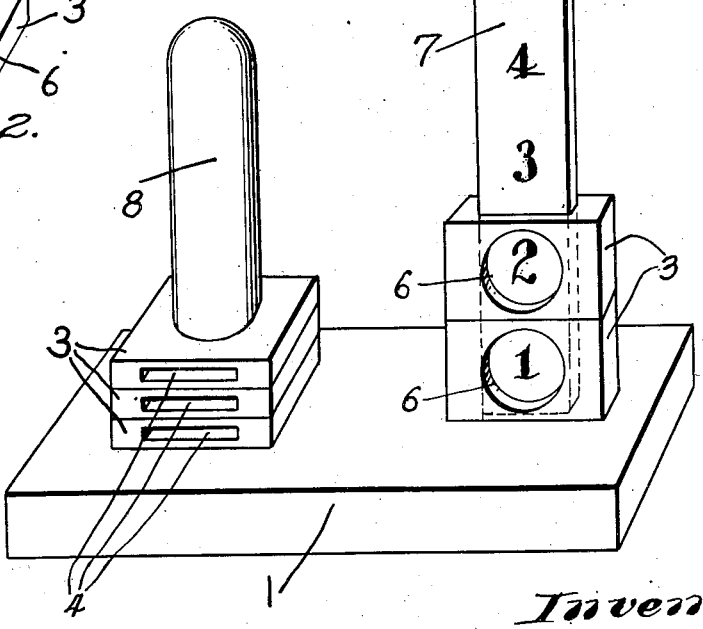
Inventor
Clifford C. Church
By Heard Smith & Tennant
Attorneys Patented Oct. 25, 1949

2,486,260

UNITED STATES PATENT OFFICE 2,486,260

EDUCATIONAL APPLIANCE

Clifford C. Church, Needham, Mass.

Application October 31, 1945, Serial No. 625,792

2 Claims. (Cl. 35—31)

This invention relates to an educational appliance designed especially for teaching arithmetic.

One object of the invention is to provide a novel educational appliance which is simple in construction and which can be effectively used for teaching the fundamentals of addition and subtraction to young pupils.

Further objects of the invention are to provide improvements in educational appliances which will be more fully hereinafter set forth and then pointed out in the appended claims.

In the drawings wherein I have illustrated some selected embodiments of my invention:

Fig. 1 is a perspective view of an apparatus embodying my invention.

Fig. 2 is a perspective view of one of the blocks used in the device of Fig. 1.

Fig. 3 is a perspective view of a different form of block which may be used.

Fig. 4 is a section on the line 4—4, Fig. 3.

The improved educational appliance herein illustrated comprises a base portion 1 from which rises an indicating member in the form of a post 2, the latter carrying on its front face a plurality of numerals indicated at 5 arranged serially. In the construction herein shown, these numerals are the numbers 1–10 with the number 1 at the bottom of the post and the number 10 at the top. It will be understood, however, that the invention is not limited to a post carrying only ten numbers or numerals as the length of the post may be varied so as to include higher numerals than ten.

Associated with the post are a plurality of similar blocks 3, each block having an opening 4 extending therethrough which is of a size and shape to fit the post 2 so that the various blocks 3 can be strung on the post one above the other.

The numerals on the face of the post 2 are evenly spaced thereon, and the space between two adjacent numerals is the same as the vertical dimension of each block 3 when the latter is strung on the post. The bottom numeral "1" of the column of numerals is spaced from the base 1 by a distance less than the vertical dimension of any block when it is placed on the post 2 so that the bottom block of a row of blocks on the post will enclose the bottom numeral "1." With this arrangement when a plurality of blocks are strung on the post as shown in Fig. 1, each block will enclose a portion of the post on which a numeral is located.

The blocks are so constructed that when they are strung on the post, the numeral enclosed by each block is visible and can be read. This may be provided for by making each block with the window 6 so located that when the blocks are assembled with the post, the numeral enclosed by any block is visible through its window 6.

The windows 6 may be either open windows or may be closed with transparent material. Or, if desired, the blocks 3 could be made so that the portion thereof which registers with the numeral on the post that is enclosed by the block is made of transparent material so that the numeral can be read therethrough; in fact, each block might be made entirely of transparent material.

The post 2 is shown as having a relatively wide front face 7 but is relatively thin, although the shape of the post may be varied without departing from the invention. The blocks 3 shown in Figs. 1 and 2 have square front and rear faces but are relatively thin.

In Figs. 3 and 4 I have shown blocks 3a which are in the form of cubes, each block having a through opening 4a of a size to receive the post 2. Each of the blocks 3a will be formed with a window or opening 6a in one side face, which opening extends to the through opening 4a so that when the blocks 3a are strung on the post, the numeral which is enclosed by any block can be read through the window 6a.

The blocks 3 are formed so that the window opening extends clear through the block at right angles to the through opening 4. With this construction, each block 3 may be placed on the post with either square face toward the front because the block has a window opening in each side.

For teaching addition by means of this appliance, the instructor will place a group of blocks on the post 2 and then the pupil will read the numeral through the window opening of the top block. Another group containing a known quantity of blocks will then be placed on the post and the numeral which can be read through the top block will give the total number of blocks on the post. To take a very simple example; if the pupil is being taught that 1+1=2, then the instructor places one block 3 on the post 2 and the pupil will read the numeral "1" through the window of this first block. Another block is then added to the post as shown in Fig. 1 and the pupil reads the numeral "2" through the window of the second block, thus giving visual evidence that 1+1=2.

If, for instance, the pupil is to add 2 and 3, then the pupil or instructor places two blocks on the post as shown in Fig. 1 and then adds three more blocks. The reading "5" through the top block will give the answer to the pupil so that the pupil receives visual evidence that 2+3=5.

If subtraction is being taught, then a given number of blocks will be placed on the post and the numeral on the post will be read through the window of the top block, such numeral giving the total number of blocks on the post.

The pupil then removes a known number of blocks and the reading through the top block of those left on the post will indicate the number of blocks remaining.

For instance, if the example to be solved is 6—3, then the pupil or instructor will place six blocks on the post so that the reading through the top block will be "6"; the pupil then removes three of the blocks and upon observing the reading through the window of the then top block, he receives visual evidence that 6—3=3.

In the device shown in Fig. 1, the base 1 is provided with a storage post 8 which is of a size to fit the window opening 6 in the blocks 3. This post 8 may be used for storing the blocks which are not in use by simply dropping each block over the post so that they will form a stack of blocks as shown in Fig. 1.

Each block is preferably a rectangular parallelepiped and the blocks when separated from the indicating post 2 and storage post 8 can be used as building blocks. This is especially true of the blocks which are in the form of a cube shown in Figs. 3 and 4.

Each cubical block 3a has three faces which are not broken by either the opening 4a or the window 6a and numerals, letters, or pictures can be imprinted upon these three unbroken faces if desired.

I claim:

1. An educational appliance comprising a base, a post rising vertically therefrom and having on one side thereof a column of numerals arranged in serial order with the lowest numeral at the bottom of the column and the highest numeral at the top, said numerals being equally spaced from each other, and a plurality of blocks identical in size and shape, each block having an opening extending vertically therethrough and of a size to receive said post, whereby the blocks can be mounted on the post one above the other, the spacing of the numerals on the post being the same as the vertical dimension of each block and the bottom numeral being spaced from the base by a distance less than the vertical dimension of any block, whereby when a plurality of blocks are thus mounted on the post, each block encloses a portion of the post carrying a numeral, each block having a window in its front vertical face situated to register with the numeral on the post enclosed by the block and of sufficient size so that said numeral can be read through the window.

2. An educational appliance comprising a base, a post rising vertically therefrom and having on one side thereof a column of numerals arranged in serial order with the lowest numeral at the bottom of the column and the highest numeral at the top, said numerals being equally spaced from each other, and a plurality of cubical blocks identical in size and shape, each block having an opening extending vertically therethrough and of a size to receive said post, whereby the blocks can be mounted on the post one above the other, the spacing of the numerals on the post being the same as the vertical dimension of each block and the bottom numeral being spaced from the base by a distance less than the vertical dimension of any block, whereby when a plurality of blocks are thus mounted on the post, each block encloses a portion of the post carrying a numeral, each block having on its front side a window opening which extends from the front face of the block to the vertical through opening only, said window opening being situated to register with the numeral on the post enclosed by the block and being of sufficient size so that said numeral can be read through the opening.

CLIFFORD C. CHURCH.

REFERENCES CITED

The following references are of record in the file of this patent:

UNITED STATES PATENTS

| Number | Name | Date |
|---|---|---|
| 805,365 | Knappe | Nov. 21, 1905 |
| 971,185 | Freeman, Sr. | Sept. 27, 1910 |
| 1,329,850 | Pye | Feb. 3, 1920 |
| 1,501,233 | Rand | July 15, 1924 |

FOREIGN PATENTS

| Number | Country | Date |
|---|---|---|
| 337,699 | Germany | June 6, 1921 |
| 64,050 | Sweden | 1925 |
| 725,755 | France | 1932 |